United States Patent
Kang et al.

(10) Patent No.: US 10,952,102 B2
(45) Date of Patent: Mar. 16, 2021

(54) METHOD AND APPARATUS FOR CONTROLLING DATA TRANSMISSION SPEED IN WIRELESS COMMUNICATION SYSTEM

(71) Applicant: Samsung Electronics Co., Ltd., Suwon-si (KR)

(72) Inventors: Seongryong Kang, Seongnam-si (KR); Jaehyun Hwang, Anyang-si (KR); Jonghyune Kim, Seoul (KR); Jungah Choi, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 13 days.

(21) Appl. No.: 16/316,829

(22) PCT Filed: Jul. 12, 2017

(86) PCT No.: PCT/KR2017/007429
§ 371 (c)(1),
(2) Date: Jan. 10, 2019

(87) PCT Pub. No.: WO2018/012858
PCT Pub. Date: Jan. 18, 2018

(65) Prior Publication Data
US 2019/0297536 A1 Sep. 26, 2019

(30) Foreign Application Priority Data
Jul. 14, 2016 (KR) .................. 10-2016-0089143

(51) Int. Cl.
*H04W 28/22* (2009.01)
*H04L 12/801* (2013.01)
(Continued)

(52) U.S. Cl.
CPC .......... *H04W 28/22* (2013.01); *H04L 47/127* (2013.01); *H04L 47/193* (2013.01); *H04L 47/26* (2013.01);
(Continued)

(58) Field of Classification Search
None
See application file for complete search history.

(56) References Cited

U.S. PATENT DOCUMENTS

| 6,347,091 B1 | 2/2002 | Wallentin et al. |
| 7,480,488 B2 | 1/2009 | Taneja |

(Continued)

FOREIGN PATENT DOCUMENTS

| KR | 10-2001-0034910 A | 4/2001 |
| WO | 2016/039577 A1 | 3/2016 |

OTHER PUBLICATIONS

Partial European Search Report dated Apr. 16, 2019, issued in European Patent Application No. 17827928.7-1215.
(Continued)

*Primary Examiner* — Peter Chen
(74) *Attorney, Agent, or Firm* — Jefferson IP Law, LLP

(57) ABSTRACT

Disclosed are a method and apparatus for controlling data transmission rate in a wireless communication system. The method for controlling transmission rate of a server according to the present invention comprises the steps of: determining an uplink transmission data rate of a first packet received from a terminal; transmitting a first parameter for controlling to increase the uplink transmission data rate; determining whether the uplink transmission data rate of a second packet received based on the first parameter increases; and transmitting a second parameter for controlling change of the uplink transmission data rate based on the determination result.

6 Claims, 8 Drawing Sheets

(51) Int. Cl.
    *H04L 12/807*      (2013.01)
    *H04W 28/02*      (2009.01)
    *H04W 28/06*      (2009.01)
    *H04W 80/02*      (2009.01)
    *H04W 88/18*      (2009.01)
    *H04W 24/02*      (2009.01)
    *H04L 12/825*      (2013.01)
    *H04W 28/12*      (2009.01)

(52) U.S. Cl.
    CPC ............ *H04L 47/27* (2013.01); *H04W 24/02* (2013.01); *H04W 28/02* (2013.01); *H04W 28/0273* (2013.01); *H04W 28/06* (2013.01); *H04W 28/12* (2013.01); *H04W 80/02* (2013.01); *H04W 88/18* (2013.01); *H04W 88/182* (2013.01)

(56) References Cited

U.S. PATENT DOCUMENTS

| | | |
|---|---|---|
| 2004/0228285 A1 | 11/2004 | Moon et al. |
| 2007/0047445 A1 | 3/2007 | Usuda et al. |
| 2008/0089250 A1 | 4/2008 | Jung |
| 2010/0260049 A1 | 10/2010 | Racz et al. |
| 2011/0149916 A1 | 6/2011 | Kwak et al. |
| 2012/0140621 A1 | 6/2012 | Wu et al. |
| 2014/0250168 A1 | 9/2014 | Damola et al. |

OTHER PUBLICATIONS

Extended European Search Report dated Jul. 18, 2019, issued in European Patent Application No. 17827928.7-1215.

METHOD AND APPARATUS FOR CONTROLLING DATA TRANSMISSION SPEED IN WIRELESS COMMUNICATION SYSTEM

TECHNICAL FIELD

The present invention relates to a method and apparatus for controlling TCP-based data transmission in a wireless communication system.

BACKGROUND ART

With the increasing use of portable devices such as smartphones and tablet PCs, demand for use of Internet content services (such as webpage access, video streaming, and social network access) via cellular radio communication networks such as long term evolution (LTE) is increasing. Most of such services are based on the transport control protocol (TCP), and the increasing number of multitasking-enabled devices leads to steady increases of uplink data traffic as well as downlink data traffic. Typically, available bandwidth differs between uplink and downlink, and the uplink available bandwidth that is relatively narrow is likely to cause uplink congestion and impose a negative effect, even to the downlink data rate. Even on the downlink with much larger available bandwidth, a chronic problem is that the TCP transmission efficiency fails to adapt quickly and effectively to the frequent state changes of a radio network that arise because of changes in the number of users and surrounding geographical features such as buildings.

DISCLOSURE OF INVENTION

Technical Problem

In order to solve the above problem, the present invention provides a method for determining optimal data rates between a terminal and a base station in such a way for the terminal to predict its uplink network status based on radio network state information being transmitted by the base station.

Solution to Problem

In accordance with an aspect of the present invention, a control method of a server includes determining an uplink transmission data rate of a first packet received from a terminal, transmitting a first parameter for controlling to increase the uplink transmission data rate, determining whether the uplink transmission data rate of a second packet received based on the first parameter increases, and transmitting a second parameter for controlling a change of the uplink transmission data rate based on the determination result.

In accordance with another aspect of the present invention, a control method of a server includes receiving radio communication information including information on a first downlink transmission data rate and a first RLC memory size from a base station, predicting a downlink data amount of a base station based on the received radio communication information, and controlling a downlink transmission data rate of the base station based on the predicted downlink data amount.

Advantageous Effects of Invention

The present invention is advantageous in terms of reducing unnecessary buffering at a terminal and mitigating uplink congestion by estimating an uplink available bandwidth and controlling the data rate of the terminal to not exceed the available bandwidth.

Also, the present invention is advantageous in terms of improving the downlink data rate (throughput) by quickly coping with the state change of a radio network in such a way of controlling the data rate based on buffer information and radio network information of the base station.

MODE FOR THE INVENTION

Figure 1:
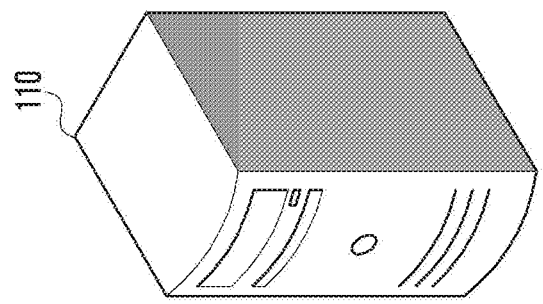
FIG. 1 is a diagram for explaining an impact of TCP acknowledgement (ACK) clocking and uplink congestion in TCP-based data communication between a terminal and a server.
Figure 1:
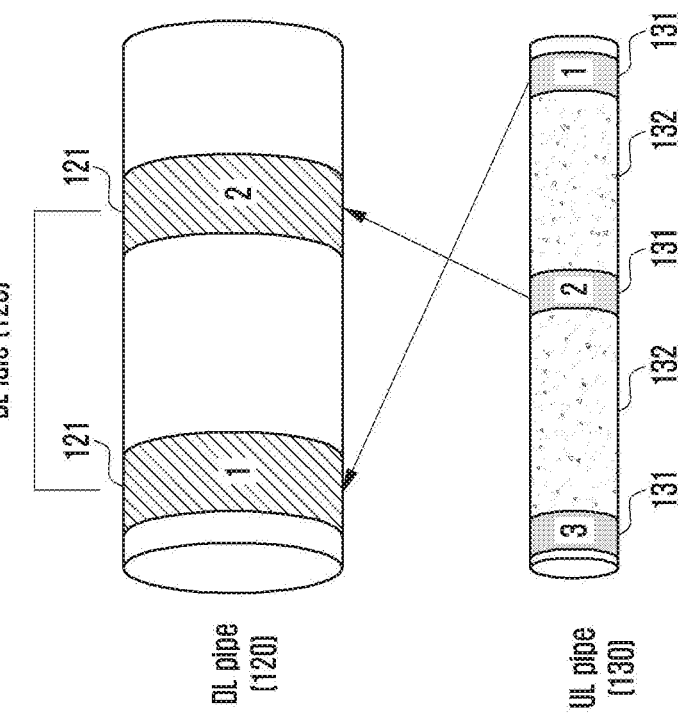
Figure 1:
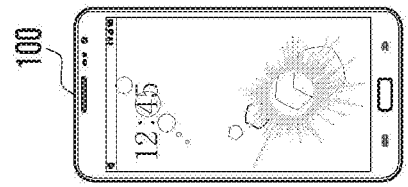

Exemplary embodiments of the present invention are described in detail with reference to the accompanying drawings. The same reference numbers are used throughout the drawings to refer to the same or like parts. Detailed descriptions of well-known functions and structures incorporated herein may be omitted to avoid obscuring the subject matter of the present invention.

Although the description is directed to an LTE system, it will be understood by those skilled in the art that the present invention can be applied even to other communication systems having a similar technical background and channel format, with a slight modification, without departing from the spirit and scope of the present invention.

Detailed descriptions of technical specifications well-known in the art and unrelated directly to the present invention may be omitted to avoid obscuring the subject matter of the present invention. This aims to omit unnecessary description so as to make clear the subject matter of the present invention For the same reason, some elements are exaggerated, omitted, or simplified in the drawings and, in practice, the elements may have sizes and/or shapes different from those shown in the drawings. Throughout the drawings, the same or equivalent parts are indicated by the same reference numbers.

Advantages and features of the present invention and methods of accomplishing the same may be understood more readily by reference to the following detailed description of exemplary embodiments and the accompanying drawings. The present invention may, however, be embodied in many different forms and should not be construed as being limited to the exemplary embodiments set forth herein. Rather, these exemplary embodiments are provided so that this invention will be thorough and complete and will fully convey the concept of the invention to those skilled in the art, and the present invention will only be defined by the appended claims. Like reference numerals refer to like elements throughout the specification.

It will be understood that each block of the flowcharts and/or block diagrams, and combinations of blocks in the flowcharts and/or block diagrams, can be implemented by computer program instructions. These computer program instructions may be provided to a processor of a general-purpose computer, special purpose computer, or other programmable data processing apparatus, such that the instructions that are executed via the processor of the computer or other programmable data processing apparatus create means for implementing the functions/acts specified in the flowcharts and/or block diagrams. These computer program instructions may also be stored in a non-transitory computer-readable memory that can direct a computer or other programmable data processing apparatus to function in a particular manner, such that the instructions stored in the non-transitory computer-readable memory produce articles of manufacture embedding instruction means that implement the function/act specified in the flowcharts and/or block diagrams. The computer program instructions may also be loaded onto a computer or other programmable data processing apparatus to cause a series of operational steps to be performed on the computer or other programmable apparatus to produce a computer implemented process such that the instructions that are executed on the computer or other programmable apparatus provide steps for implementing the functions/acts specified in the flowcharts and/or block diagrams.

Furthermore, the respective block diagrams may illustrate parts of modules, segments, or codes including at least one or more executable instructions for performing specific logic function(s). Moreover, it should be noted that the functions of the blocks may be performed in a different order in several modifications. For example, two successive blocks may be performed substantially at the same time, or they may be performed in reverse order according to their functions.

According to various embodiments of the present invention, the term "module", means, but is not limited to, a software or hardware component, such as a Field Programmable Gate Array (FPGA) or Application Specific Integrated Circuit (ASIC), which performs certain tasks. A module may advantageously be configured to reside on the addressable storage medium and configured to be executed on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionalities of the components and modules may be combined into fewer components and modules or further separated into more components and modules. In addition, the components and modules may be implemented such that they execute one or more CPUs in a device or a secure multimedia card.

FIG. 1 is a diagram for explaining an impact of TCP acknowledgement (ACK) clocking and uplink congestion in TCP-based data communication between a terminal and a server.

Most of web applications use TCP as their data transmission protocol, and the transmission control of a TCP algorithm includes essentially an ACK-clocking scheme. Such ACK-based self-clocking allows for transmission of new data packets only when an ACK is received, thereby automatically controlling the data rate of the server based on the bottleneck bandwidth and the reception rate of ACKs to the server. Accordingly, it is necessary for an uplink ACK to arrive at the server at an appropriate time for smooth downlink packet transmission.

In reference to FIG. 1, the terminal 100 and the server 110 communicate packets through an uplink channel 130 and a downlink channel 120. In FIG. 1, the uplink channel 130 and the downlink channel 120 are depicted in the form of pipes different in diameter to show that they are asymmetric in bandwidth. That is, the diameter of each pipe denotes an available bandwidth of the corresponding channel.

In FIG. 1, uplink data packets 132 and three ACK packets 131 that are respectively marked with numbers 1, 2, and 3 travel on the uplink channel 130 from the terminal 100 to the server 110. As shown in FIG. 1, as the amount of uplink data 132 interposed between the ACK packets 131 that are transmitted by the terminal 100 increases, the arrival of the ACK packets 131 at the server 100 is likely to be delayed.

The server 110 may transmit downlink data packets in response to the ACK packets 131 being received from the terminal 100. Here, if the ACK packet 2 is delayed by the uplink data packet following the ACK packet 1, the downlink pipe 120 may enter an idle state as denoted by reference number 125 even though there is no data congestion on the downlink pipe. Such a downlink idle period decreases the downlink throughput.

The available downlink bandwidth between the terminal 100 and the server 100 may frequently vary according to the change in the number of users and channel condition in the radio network, and such channel variation is likely to disrupt efficient data rate control.

Figure 2:
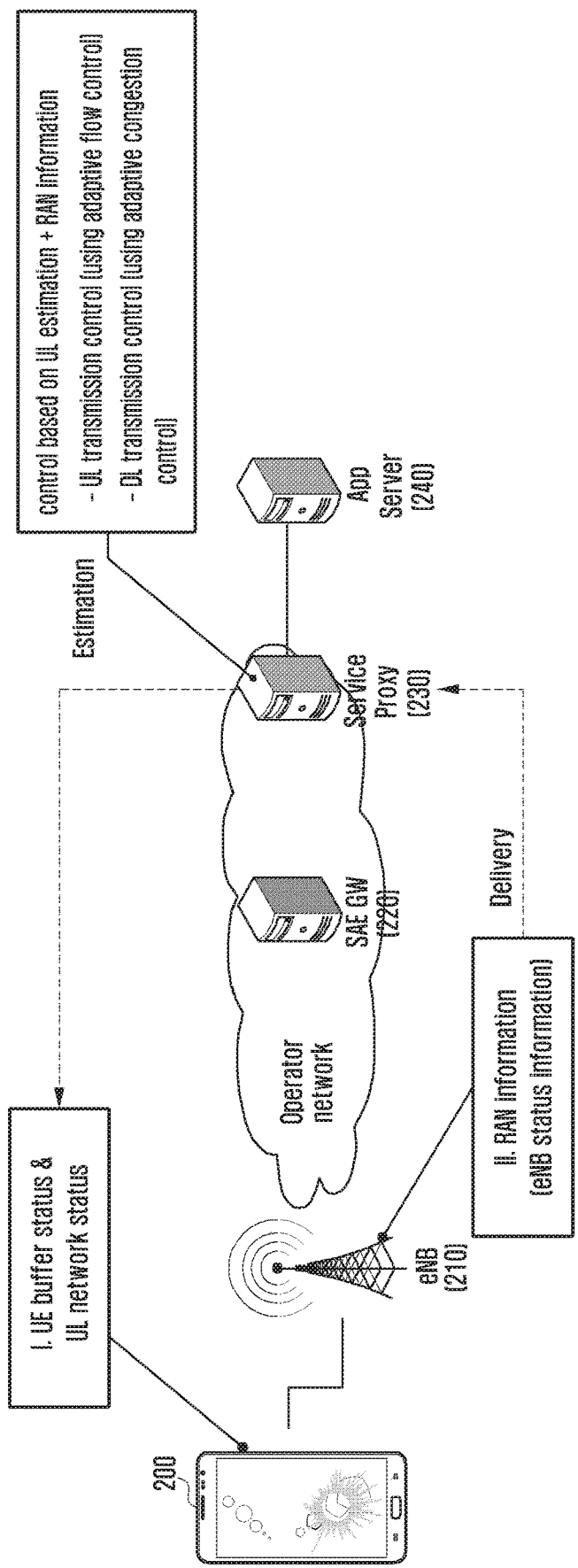
FIG. 2 is a diagram illustrating a structure of a communication system allowing for a proxy server to analyze network information to determine an optimal data rate according to an embodiment of the present invention.

FIG. 2 is a diagram illustrating a structure of a communication system according to an embodiment of the present invention. In reference to the drawing, the communication system according to an embodiment of the present invention is characterized by controlling a data rate based on radio network information estimated by a service proxy (230 interposed between a system architecture evolution gateway (SAE-GW) 220 of a radio network and an application server 240 of the Internet.

As shown in FIG. 2, an evolved Node B (eNB) 210 is an access node to which a user equipment (UE) 200 connects via a radio channel. In LTE, all user traffic including real time services such as Voice over IP (VoIP) is served through shared channels; thus, there is a need of an entity for collecting UE-specific status information and scheduling the UEs based on the collected information, and the eNB 210 takes charge of such functions. Typically, one eNB 210 hosts multiple cells. The SAE-GW 220 is a packet core entity including a serving gateway (S-GW) and a packet data network GW (PDN-GW) and, also, it is a node for connecting the access node to a packet-switched network such as Internet and supporting UE mobility and IP address allocation.

There may be a proxy server on the network, which receives data from an external application server 240 and transmit the data to the eNB 210 via the SAE-GW 220. The proxy server 230 may cache a list received from the external application server for improving data rates. The proxy server 230 may be a server under the control of a provider and, in an embodiment, it predicts buffer status of the UE and uplink (UL) network status, receives RAN information (eNB status information), and controls uplink and downlink data rates. Although the data rates are controlled by a proxy server in an embodiment by way of example, it may be possible for the external application server to control the data rates.

Figure 3:
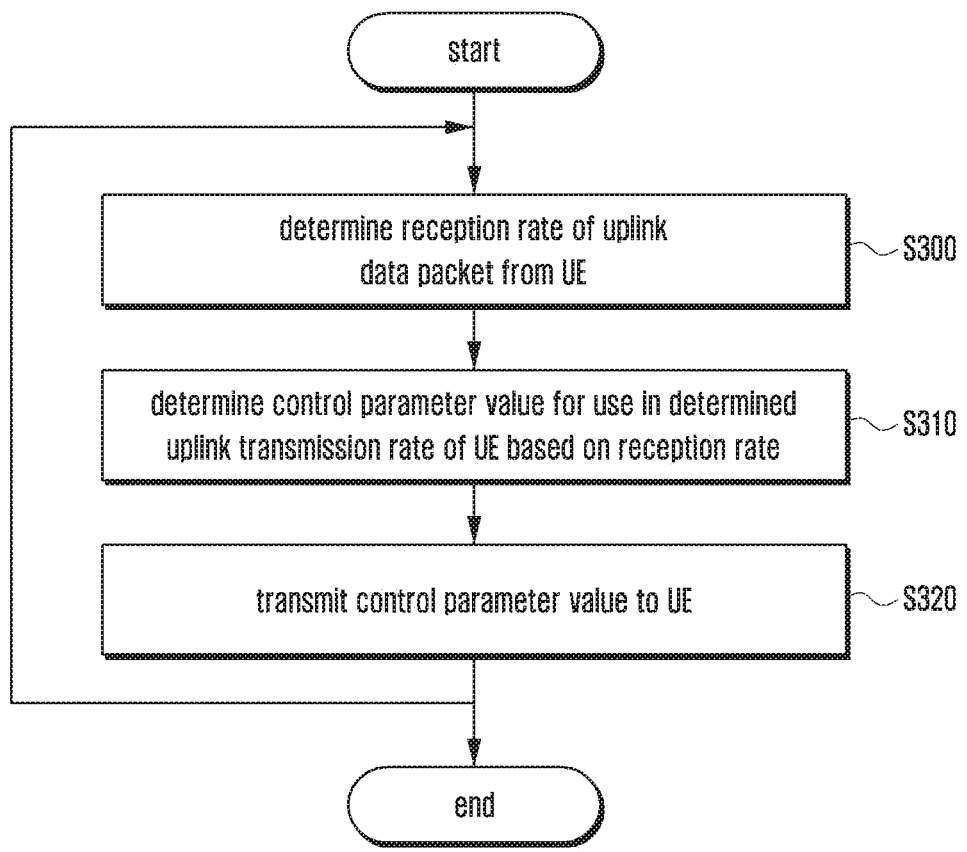
FIG. 3 is a flowchart illustrating a method for a proxy server to control an uplink transmission data rate of a UE according to an embodiment of the present invention.

FIG. 3 is a flowchart illustrating a method for a proxy server to control an uplink transmission data rate of a UE according to an embodiment of the present invention.

At step S300, the proxy server determines an reception rate of uplink data packets from a UE. For example, the proxy server may count packets during a predetermined time period to determine the reception rate of uplink data packets.

At step S310, the proxy server may determine a control parameter value for use in determining uplink transmission data rates of the UE based on the reception rate. The control parameter may be a receive window (rwnd) as one of TCP flow control parameters. A TCP receive window (rwnd) size is the information being transmitted to a sender for preventing a receive buffer of a receiver from overflowing with excessive data from the sender.

The proxy server may increase or decrease an uplink data packet rate of the UE by adjusting the value of the control parameter. The proxy server may estimate available uplink bandwidth and determine the value of the control parameter based on the reception rate of packets from the UE and the estimated available uplink bandwidth. The method for the proxy server to determine the value of the control parameter is described in detail later with reference to FIGS. 6 and 7.

At step S320, the proxy server transmits the control parameter determined at step S310 to the sender. The control parameter value may be included in a header of a TCP ACK packet being transmitted to the UE.

Figure 4:
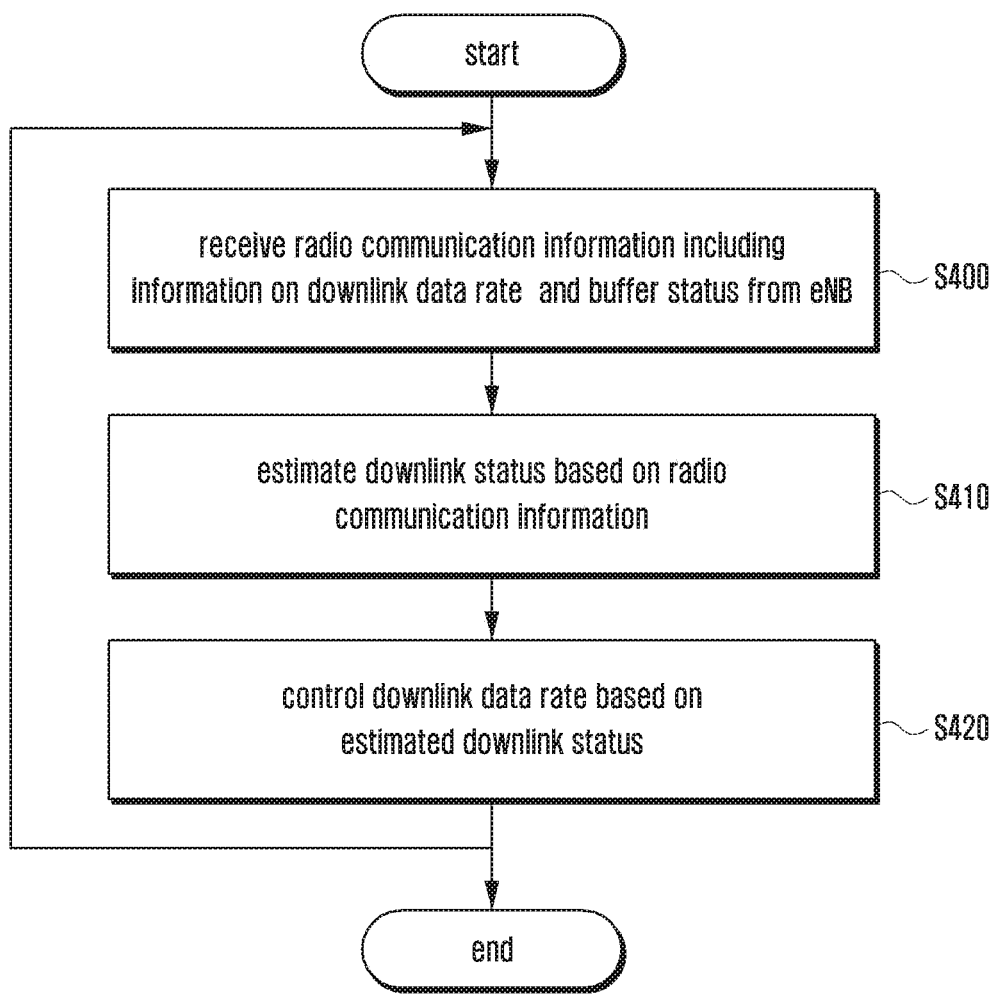
FIG. 4 is a flowchart illustrating a method for a proxy server to control a downlink data rate of an eNB according to an embodiment of the present invention.

FIG. 4 is a flowchart illustrating a method for a proxy server to control a downlink data rate of an eNB according to an embodiment of the present invention.

At step S400, the proxy server may receive radio status information from the eNB, the radio status information including information on the downlink data rate and buffer status (e.g., number of bytes of packets included in a radio link control (RLC) layer buffer) of the eNB. At step S410, the proxy server may estimate downlink status of the eNB based on the received radio status information.

The proxy server may receive the radio status information (radio access network (RAN) information) from the eNB and analyze the RAN status of the eNB based on the received information to predict a number of downlink traffic flows and fair data rates. The radio status information being transmitted from the eNB to the proxy server may include information on at least the downlink data rate and RLC layer queue length at the eNB.

The radio status information may further include at least one of a bearer identifier and an update interval. The update interval indicates an interval for updating the radio status information of the eNB. In the case where the radio status information does not include the bearer identifier or the update interval, the proxy server may predict the bearer identifier or the update interval. The method for the proxy server to predict the bearer identifier or the update interval is described later in detail.

Also, the method for the proxy server to estimate the downlink status of the eNB based on the above-described information is described later in detail.

At step S420, the proxy server may control the downlink data rate of the eNB according to the estimated downlink status. In detail, the proxy server may estimate per-flow fair data rates, predict a maximum transmit data amount that does not cause packet loss at the eNB, and control to reach the fair data rates promptly in the range where the downlink data rate causes no packet loss.

Figure 5:
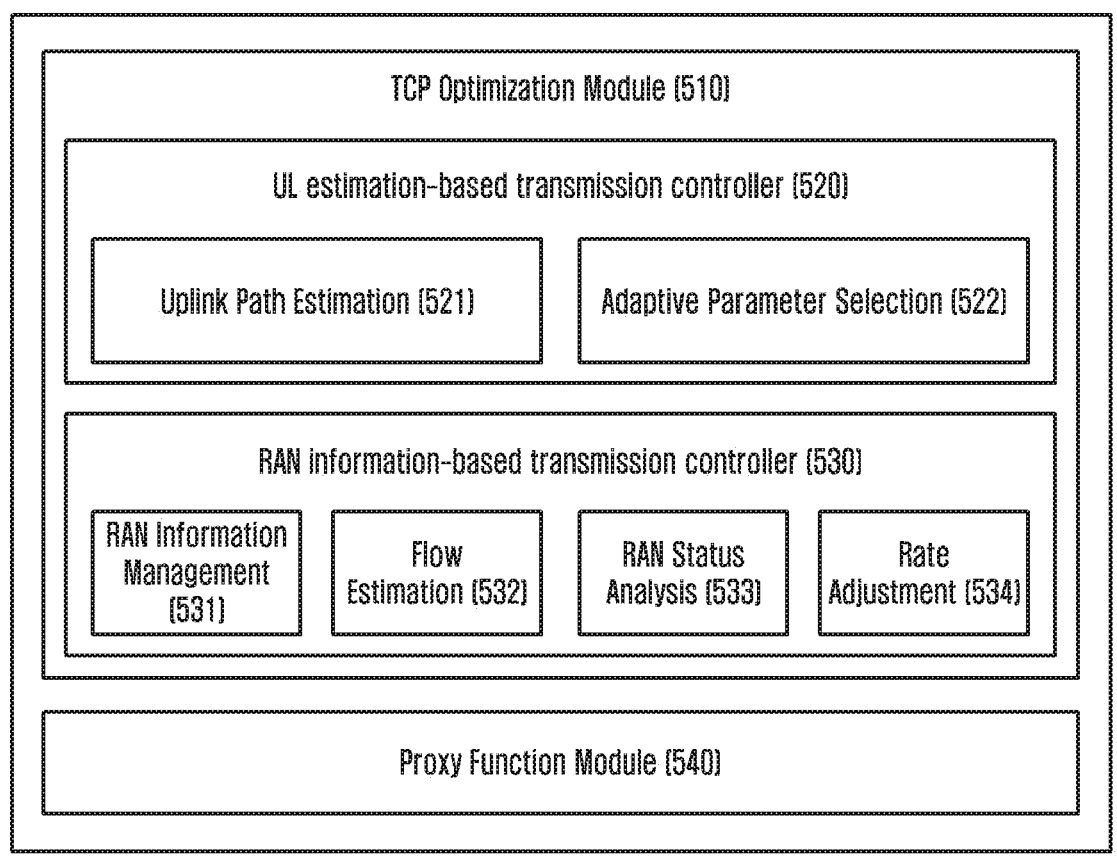
FIG. 5 is a block diagram illustrating a configuration of a proxy server according to an embodiment of the present invention.

FIG. 5 is a block diagram illustrating a configuration of a proxy server according to an embodiment of the present invention.

As shown in FIG. 5, the proxy server 500 may include a TCP optimization module 510 and a proxy function module 540.

The TCP optimization module 510 may estimate the available uplink bandwidth of the eNB and control the uplink transmission data rate of the UE based on the estimated available uplink bandwidth and may receive the radio status information from the eNB and control the downlink transmission data rate of the eNB based on the received radio status information.

In order to accomplish the aforementioned functions, the TCP optimization module 510 may include a UL estimation-based transmission controller 520 and a RAN information-based transmission controller 530.

The UL estimation-based transmission controller 520 may include a UL path estimation unit 521 and an adaptive parameter selection unit 522. The UL estimation-based transmission controller 520 is described later in detail.

The RAN information-based transmission controller 530 may include a RAN information management unit 531, a RAN status analysis unit 533, and a data rate adjustment unit 534. The RAN information-based transmission controller 530 is described later in detail.

Meanwhile, the proxy function module 540 may perform the functions of a normal proxy server. For example, the proxy function module 540 may transmit data received from the application server to the eNB instead via an S-GW.

Figure 6:
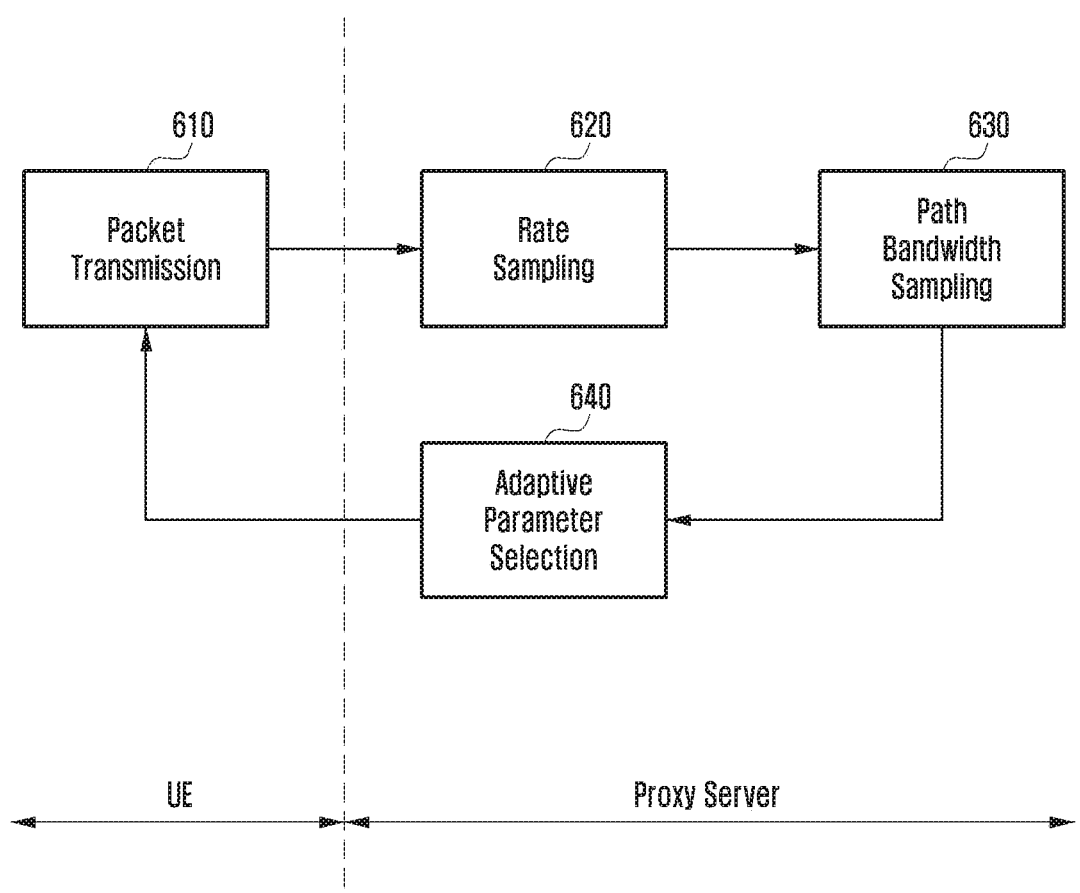
FIG. 6 is a diagram illustrating a configuration of a component of a proxy server for controlling an uplink transmission data rate of an UE according to an embodiment of the present invention.

FIG. 6 is a diagram illustrating a configuration of a component of a proxy server for controlling an uplink transmission data rate of a UE according to an embodiment of the present invention.

Data packets may be received from a UE as denoted by reference number 610. The proxy server may receive uplink data packets transmitted by the UE via an eNB.

The proxy server may calculate the data rate of the data packets arriving from the UE to predict the uplink transmission data rate of the UE as denoted by reference 620.

The data rate of the uplink data packets from the UE may be predicted using Equation 1

$$\hat{R}_a(k) = \frac{1}{t_k - t_{k-1}} \sum_{j=1}^{n} s_j \qquad \text{[Equation 1]}$$

In Equation 1, $t_k$ denotes a time for predicting the data rate of the arrived data packets, n denotes a number of packets, and $s_j$ denotes a size of a packet j.

According to an embodiment, it may be possible to use three methods for predicting the data rate of the data packets.

The first method is to calculate an average of a predetermined number of samples, e.g., n sample, when the predetermined number of samples are gathered. In the first method, the predicted data rate of the data packets may appear as a step function.

The second method is to calculate an average of a predetermined number of samples counted in such a way of excluding the oldest arrived packet and including a newly arrived packet whenever a packet arrives.

For example, the proxy server may predict the average data rate of 10 packets from packet $n_1$ to packet $n_{10}$ and, if packet $n_{11}$ arrives, predict the average data rate of the packets from packet $n_2$ to packet $n_{11}$. In the same manner, it may be possible to predict the average data rate of the 10 packets from packet $n_3$ to packet $n_{12}$ upon arrival of packet $n_{12}$.

The third method is to calculate the average data rate of samples in such a way of predicting the average rate, increasing the number of samples from n to 2n, and discarding, if the number of samples reaches 2n, the previously received n samples and increasing the number of samples from n to 2n again.

For example, if a predetermined number of samples is 10, the proxy server predicts the average data rate of 10 packets from packet $n_1$ to packet $n_{10}$ and, if packet $n_{11}$ arrives, predicts the average data of 11 packets from packet $n_1$ to packet $n_{11}$. If packet $n_{12}$ arrives, it may be possible to predict the average data rate of 12 packets from $n_1$ to packet $n_{12}$.

In the above-described method, the number of samples for use in predicting the average data rate may increase by 1 until receipt of packet $n_{19}$. If packet $n_{20}$ arrives, the proxy server may predict the average data rate by increasing the number of samples by 1 from packet $n_{11}$ to packet $n_{30}$.

The proxy server may perform smoothing on the predicted data rate of the data packets. For example, the proxy server may perform smoothing on the data rate of the data packets using Equation 2.

$$R_a(k)=(1-\alpha)R_a(k-1)+\alpha\hat{R}_a(k) \quad \text{[Equation 2]}$$

In Equation 2, α is an adjustment parameter having a value equal to or greater than 0 and less than 1. By calculating the data rate of data packets at time k with Equation 2, the proxy server may reflect the data rate of data packets that is predicted at time k−1.

Meanwhile, the proxy server may perform sampling on the available bandwidth of the network path as denoted by reference number 630. The proxy server may select a parameter adaptively as denoted by reference number 640. The parameter may be rwnd value as a TCP flow control parameter.

For example, in order to perform sampling on available bandwidth of the uplink path, the proxy server may control the rwnd value provided to the UE to determine whether the uplink transmission data rate ($R_\alpha$) of data packets arriving at the proxy server from the UE is saturated.

In detail, the proxy server may transmit data packets to the UE, increasing the rwnd value gradually. Here, the rwnd may increase by an arbitrary value and, in an embodiment of the present invention, it increases by a maximum segment size (MSS) every packet. If the data rate of data packets received from the UE increases as the rwnd value increases, the proxy server may determine whether there is any remaining available bandwidth on the uplink path of the terminal.

If the data rate of data packets from the UE does not increase any more even though the proxy server increases the rwnd value for the UE, the proxy server may determine that the uplink transmission data rate of the UE is saturated. If it is determined that the uplink transmission data rate of the UE is saturated, the proxy server may determine that the UE is utilizing all available bandwidth of the uplink path.

If the uplink transmission data rate of the UE is saturated, the proxy server may transmit a reduced rwnd value to the UE to decrease the uplink transmission data rate. Here, the reduction amount of the uplink transmission data rate may be determined arbitrarily, e.g., rwnd=Ra*(1−b) in an embodiment of the present invention. Here, b is a constant greater than 0 and equal to or less than 1, e.g., 0.25. If the uplink transmission data rate of the UE decreases according to the reduced rwnd value, the proxy server may increase the rwnd value again.

Figure 7:
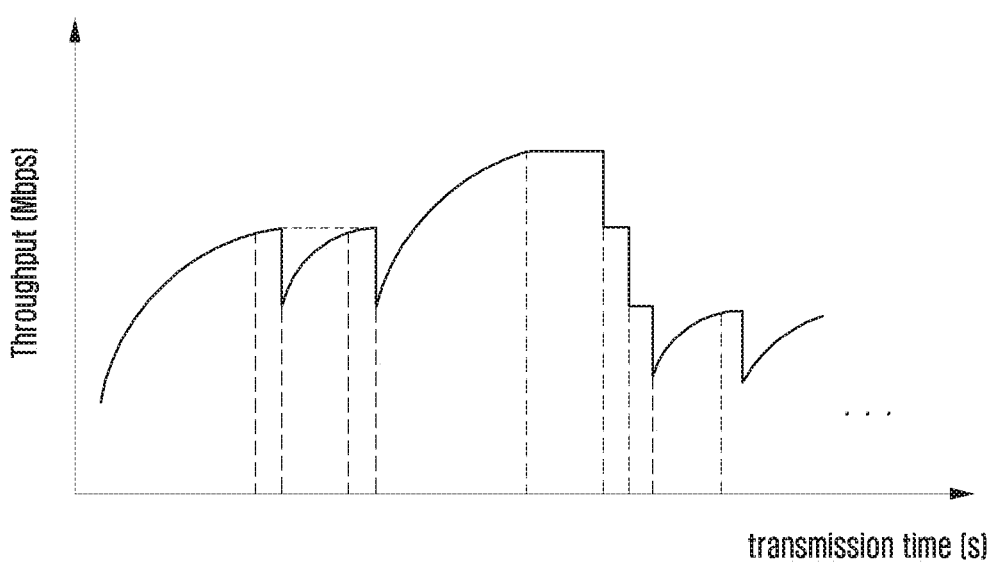
FIG. 7 is a graph illustrating an uplink transmission data rate of a UE that is changing as a proxy server controls a value of a data rate control parameter according to an embodiment of the present invention.

The uplink transmission data rate of the UE is changed according to the rwnd value changing under the control of the proxy server as shown in the graph of FIG. 7.

As described above, the proxy server may control such that an optimal uplink control data rate is maintained in a buffering manner.

Figure 8:
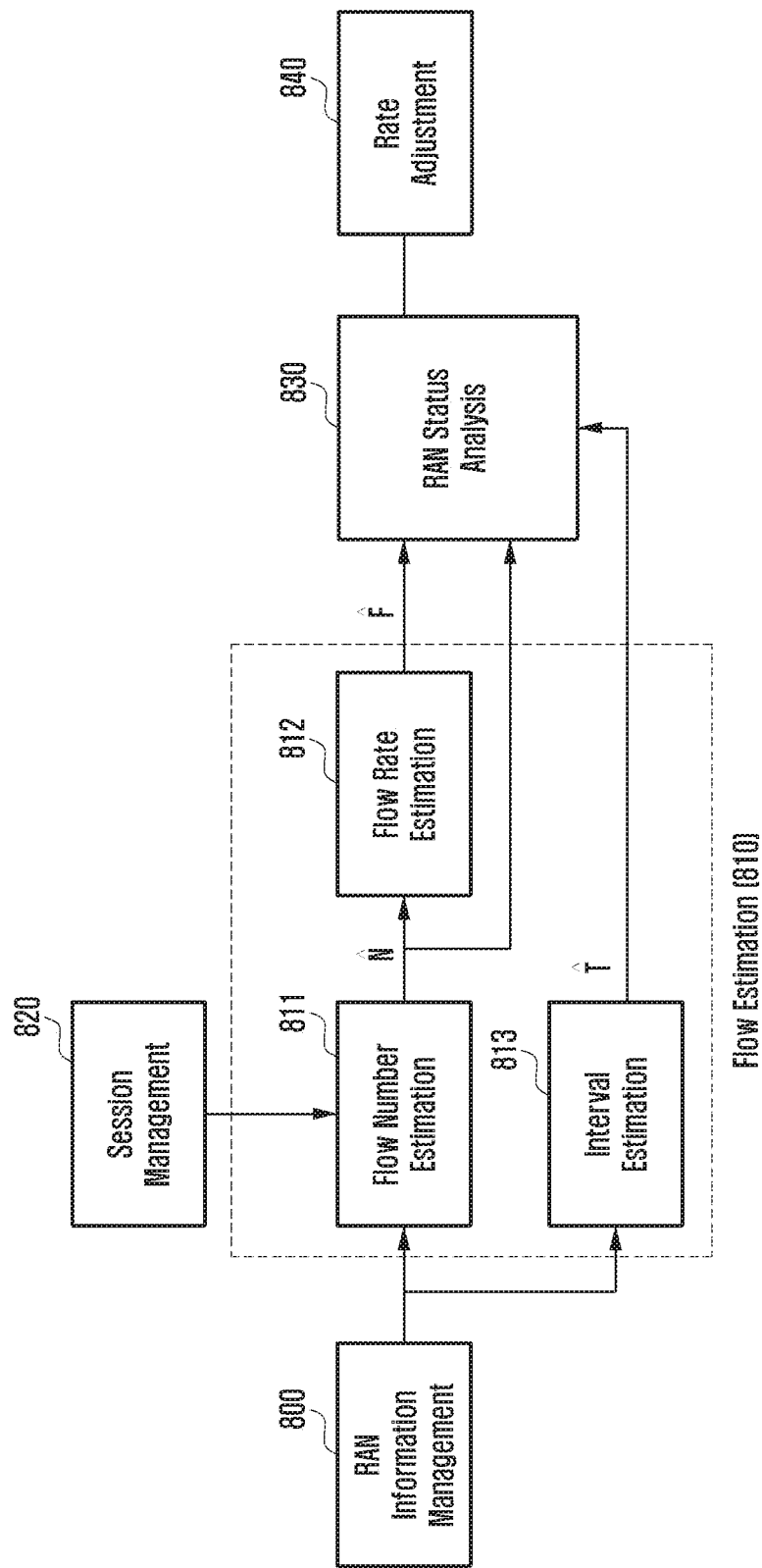
FIG. 8 is a block diagram illustrating a configuration of a proxy server for controlling a downlink data rate of an eNB according to an embodiment of the present invention.

FIG. 8 is a block diagram illustrating a configuration of a proxy server for controlling a downlink transmission data rate of an eNB according to an embodiment of the present invention.

A RAN information management unit 800 of the proxy server may receive radio status information including information on a downlink data rate and eNB buffer status from an eNB.

The radio status information received from the eNB may include information on at least the downlink data rate and RLC layer queue length of the eNB. The radio status information may include one or both of a bearer identifier and an update interval. If the radio status information does not include the bearer identifier or the update interval, the proxy server may predict the bearer identifier or update interval by means of a flow estimation unit 810

The flow estimation unit 810 of the proxy server may estimate a number of active flows ($\hat{N}$) generating current traffic based on information on the start and end of the TCP session being managed by a session management unit 820 as denoted by reference number 811. The proxy server may monitor for the start and end of each session by means of the session management unit 820 and manage an information map including per-bearer downlink data rates and an RLC layer queue length. The information map may include the bearer identifier and the update interval.

If the radio status information received from the eNB includes no bearer identifier, the proxy server may perform a bearer identification procedure. In detail, if a new TCP session is established with the UE to begin a flow, the proxy server may check whether the new flow is identical with a record of the previously-registered per-bearer map to determine whether the flow belongs to a previously established bearer or a network bearer. For example, if the received downlink data rate and RLC layer queue length information is different from the previously received downlink data rate and RLC layer queue length information, the proxy server may determine that the new flow belongs to a new flow. If the new bearer is identified, the proxy server may generate an information map of the new bearer.

The proxy server may also predict a fair data rate ($\hat{F}$) per flow based on the predicted number of flows ($\hat{N}$) as denoted by reference number 812. For example, the proxy server may determine a data amount ($B_{all}$) transmittable during a round trip time (RTT) by multiplying the downlink data rate included in the radio status information received from the eNB by the RTT. The least RTT estimated between the proxy server and the UE may be used as the RTT value.

The proxy server may predict the fair data rate ($\hat{F}$) per flow by dividing the determined data rate ($B_{dl}$) by the predicted number of flows ($\hat{N}$). In detail, the per-flow fair data rate ($\hat{F}$) may be expressed as Equation 3.

$$\hat{F} = \frac{B_{dl}}{\hat{N}} \quad \text{[Equation 3]}$$

Meanwhile, the proxy server may predict an updated interval ($\hat{T}$). For example, the proxy server may trace a time ($t_k$) changed from the previous value in a per-bearer record being received from the eNB. Accordingly, the proxy server may predict the update interval ($\hat{T}$) as denoted by reference number 813 according to Equation 4.

$$\hat{T} = t_k - t_{k-1} \quad \text{[Equation 4]}$$

Using the values predicted by the above-described method, the proxy server may analyze the RAN status. In detail, the proxy server may predict a downlink data amount to an extent that does not overflow the eNB buffer based on the estimated number of flows and estimated per-flow fair data rate, as shown in Inequity 5.

$$\frac{1}{8}\sum_{i=1}^{\hat{N}} \hat{F}\left(T_i + \frac{1}{2}RTT_i\right) \leq \gamma Q \quad \text{[Inequity 5]}$$

Here, $\hat{N}$ denotes the estimated number of active flows, $\hat{F}$ denotes per-estimated flow data rate, $T_i$ denotes the $i^{th}$ feedback interval, and $\gamma Q$ denotes an available buffer amount of the eNB.

As described above, if the number of active flows, the per-flow fair data rates, and the data amount to the extent that does not overflow the eNB buffer are estimated, the proxy server may compare the current per-flow data rate with the estimated fair data rate and control the downlink data rate to minimize overflow of the eNB buffer and transmit promptly as much data as the fair data rate.

In detail, if the data rate $W_{k-1}$ at time k−1 is less than the fair data rate $\hat{F}_k$ estimated at time k, the proxy server increases the data rate according to Equation 6.

$$W_k = W_{k-1} + \frac{\alpha_k}{\hat{N}_k W_{k-1}} \quad \text{[Equation 6]}$$

Here, $W_k$ denotes the new data rate at time k, $W_{k-1}$ denotes the data rate at time k−1, $\alpha_k$ denotes the maximum data amount transmittable to the eNB without overflow of the eNB buffer that is estimated at time k, and $\hat{N}_k$ is the number of flows predicted at time k.

Because $\alpha_k$ means Inequity 5, Equation 7 may be derived by applying Inequity 5 to Equation 6.

$$W_k = W_{k-1} + \frac{1}{8\hat{N}_k W_{k-1}} \sum_{i=1}^{\hat{N}_k} \hat{F}_k\left(T_i + \frac{1}{2}RTT_i\right) \quad \text{[Equation 7]}$$

If the data rate $W_{k-1}$ at time k−1 is equal to or greater than the estimated fair data rate $\hat{F}_k$, the proxy server may set the data rate at time k to $W_k = \hat{F}_k$ to decrease promptly the data rate to the fair data.

According to the above-described method, the proxy server may control to use the available bandwidth promptly and fairly to improve the downlink throughput of the radio network.

The data rate control method of the server according to various embodiments of the present invention may be coded in software and stored in a non-transitory readable medium. The non-transitory readable medium may be used in various devices.

The non-transitory readable medium means a machine-readable medium for storing data semi-persistently rather than a medium for storing data temporarily such as a register, cache, and memory. In detail, the non-transitory readable media may include CD, DVD, hard disc, Blu-ray disc, USB, memory card, and ROM.

Although preferred embodiments of the invention have been described using specific terms, the specification and drawings are to be regarded in an illustrative rather than a restrictive sense in order to help understand the present invention. It is obvious to those skilled in the art that various modifications and changes can be made thereto without departing from the broader spirit and scope of the invention and such modifications and changes should not be understood individually from the technical spirit or prospect of the present invention.

The invention claimed is:

1. A server comprising:
a transceiver; and
a controller configured to control to:
identify an uplink reception data rate of a first packet received from a terminal,
control the transceiver to transmit a first parameter for controlling to increase an uplink reception data rate between the server and the terminal,
identify whether an uplink reception data rate of a second packet received from the terminal increases to be greater than the uplink reception data rate of the first packet, wherein the uplink reception data rate of the second packet is based on the first parameter,
control the transceiver to transmit a second parameter for controlling to increase the uplink reception data rate between the server and the terminal, in case that the uplink reception data rate of the second packet is identified as being greater than the uplink reception data rate of the first packet, and
control the transceiver to transmit a third parameter for controlling to decrease the uplink reception data rate between the server and the terminal, in case that the uplink reception data rate of the second packet does not increase greater than the uplink reception data rate of the first packet.

2. The server of claim 1, wherein the uplink reception data rate is determined as a ratio for a number of data packets being received from the terminal during a critical time.

3. The server of claim 2, wherein the ratio is determined as a sum of a first uplink reception data rate determined during a previous critical time and a second reception data rate determined during a current critical time.

4. A control method of a server, the method comprising:
identifying an uplink reception data rate of a first packet received from a terminal;
transmitting a first parameter for controlling to increase an uplink reception data rate between the server and the terminal;
identifying whether an uplink reception data rate of a second packet received from the terminal increases to be greater than the uplink reception data rate of the first packet, wherein the uplink reception data rate of the second packet is based on the first parameter;

transmitting a second parameter for controlling to increase the uplink reception data rate between the server and the terminal, in case that the uplink reception data rate of the second packet is identified as being greater than the uplink reception data rate of the first packet; and transmitting a third parameter for controlling to decrease the uplink reception data rate between the server and the terminal, in case that the uplink reception data rate of the second packet does not increase greater than the uplink reception data rate of the first packet.

5. The method of claim 4, wherein the uplink reception data rate is determined as a ratio for a number of data packets being received from the terminal during a critical time.

6. The method of claim 5, wherein the ratio is determined as a sum of a first uplink reception data rate determined during a previous critical time and a second reception data rate determined during a current critical time.

* * * * *